US009782925B2

(12) United States Patent
McGurk et al.

(10) Patent No.: US 9,782,925 B2
(45) Date of Patent: Oct. 10, 2017

(54) TEMPERATURE PROBE

(71) Applicant: Plastic Technologies, Inc., Holland, OH (US)

(72) Inventors: Jonathan Alan McGurk, Toledo, OH (US); Aaron Raphael Teitlebaum, Holland, OH (US)

(73) Assignee: PLASTIC TECHNOLOGIES, INC., Holland, OH (US)

( * ) Notice: Subject to any disclaimer, the term of this patent is extended or adjusted under 35 U.S.C. 154(b) by 406 days.

(21) Appl. No.: 14/526,601

(22) Filed: Oct. 29, 2014

(65) Prior Publication Data
US 2015/0117489 A1    Apr. 30, 2015

Related U.S. Application Data

(60) Provisional application No. 61/898,235, filed on Oct. 31, 2013, provisional application No. 62/002,468, filed on May 23, 2014.

(51) Int. Cl.
*B29C 49/78*    (2006.01)
*G01J 5/02*    (2006.01)
*B29C 49/64*    (2006.01)
*G01J 5/00*    (2006.01)
*G01J 5/08*    (2006.01)
*G01J 5/06*    (2006.01)

(52) U.S. Cl.
CPC ........ *B29C 49/786* (2013.01); *B29C 49/6409* (2013.01); *G01J 5/0003* (2013.01); *G01J 5/06* (2013.01); *G01J 5/0809* (2013.01); *G01J 5/0815* (2013.01); *B29C 2949/78151* (2013.01); *B29C 2949/78386* (2013.01); *B29C 2949/78495* (2013.01); *G01J 2005/0085* (2013.01)

(58) Field of Classification Search
USPC .................................................. 374/110, 124
See application file for complete search history.

(56) References Cited

U.S. PATENT DOCUMENTS

| | | | | |
|---|---|---|---|---|
| 2,900,820 A | * | 8/1959 | Serafin ..................... | G01K 3/14 374/112 |
| 3,771,350 A | * | 11/1973 | Romans ................ | G01M 3/002 250/256 |
| 4,176,554 A | | 12/1979 | Kazmierowicz | |
| 4,412,090 A | | 10/1983 | Kawate et al. | |
| 4,459,043 A | * | 7/1984 | Luke ..................... | G01J 5/0022 356/43 |
| 4,653,935 A | | 3/1987 | Daily et al. | |

(Continued)

OTHER PUBLICATIONS

"PreTemp Temperature Probe" press release dated Jan. 1, 2014, retrieved from https://www.plastictechnologies.com/news/2014/10/pretemp(tm)-temperature-probe.aspx.*

*Primary Examiner* — Clayton E Laballe
*Assistant Examiner* — Leon W Rhodes, Jr.
(74) *Attorney, Agent, or Firm* — Michael E. Dockins; Shumaker, Loop & Kendrick, LLC

(57) ABSTRACT

The present invention includes a temperature probe and use thereof. The temperature probe is configured to obtain a temperature of a blow molding preform, especially a temperature of an inside surface of the blow molding preform. In this manner, effectiveness of heating the preform can be evaluated, the presence of one or more temperature gradients ascertained, and the blow molding process can be optimized for a given preform.

20 Claims, 3 Drawing Sheets

(56) References Cited

U.S. PATENT DOCUMENTS

| | | | |
|---|---|---|---|
| 4,707,148 | A | 11/1987 | Richmond |
| 4,919,543 | A | 4/1990 | Davis et al. |
| 5,408,893 | A | 4/1995 | McLeroy |
| 5,615,953 | A | 4/1997 | Moskal |
| 6,386,757 | B1 * | 5/2002 | Konno .................. G01J 5/02 374/158 |
| 6,599,011 | B2 | 7/2003 | Daily et al. |
| 6,839,652 | B2 | 1/2005 | Shelby et al. |
| 7,004,625 | B2 | 2/2006 | Egidio |
| 7,220,378 | B2 | 5/2007 | Cochran et al. |
| 8,109,670 | B2 | 2/2012 | Al-Misfer |
| 8,556,502 | B2 * | 10/2013 | Austen ................ G01K 1/026 374/110 |
| 2001/0038709 | A1 * | 11/2001 | Bett .................. G06T 7/0004 382/141 |
| 2003/0212341 | A1 | 11/2003 | Pompei et al. |
| 2007/0146994 | A1 | 6/2007 | Germagian et al. |
| 2008/0103723 | A1 * | 5/2008 | Burdett ................ G01K 1/02 702/130 |
| 2011/0062611 | A1 | 3/2011 | Menary et al. |
| 2011/0175246 | A1 | 7/2011 | Winzinger |
| 2011/0236518 | A1 | 9/2011 | Cetinel et al. |
| 2013/0141558 | A1 * | 6/2013 | Jeon ................ A61B 1/00177 348/77 |

* cited by examiner

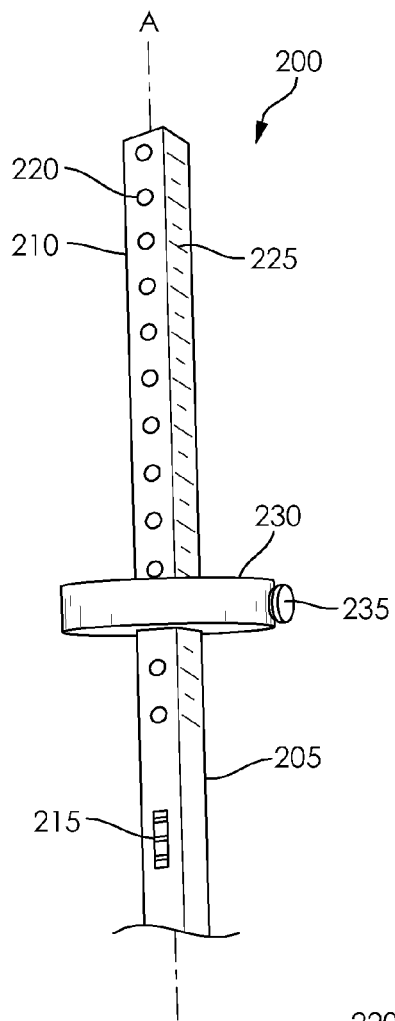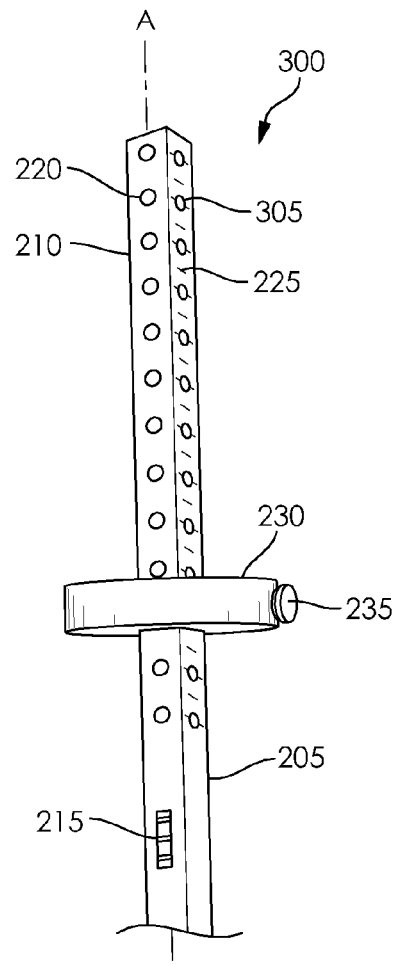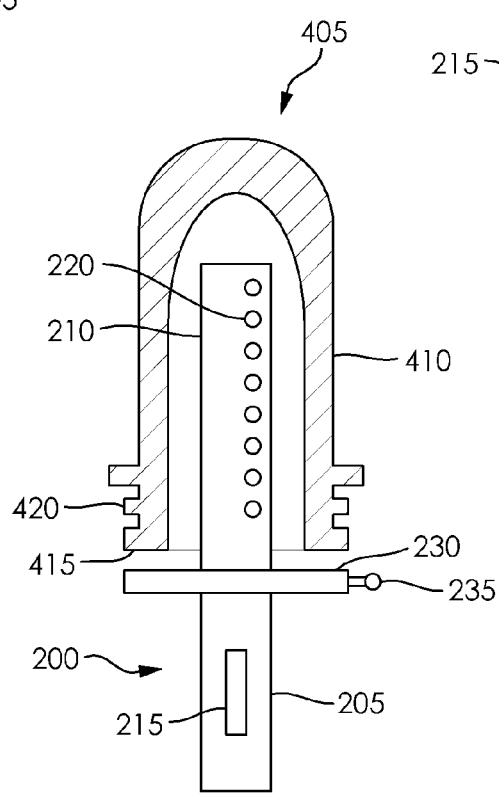
FIG. 2
FIG. 3
FIG. 4

TEMPERATURE PROBE

CROSS-REFERENCE TO RELATED APPLICATIONS

This application claims the benefit of U.S. Provisional Application No. 61/898,235, filed on Oct. 31, 2013, and U.S. Provisional Application No. 62/002,468, filed on May 23, 2014. The entire disclosures of the above applications are incorporated herein by reference.

FIELD OF THE INVENTION

The present invention relates generally to a temperature probe and, more specifically, to a non-contact temperature probe that measures the temperature of at least one surface of a preform used to make a blow molded article.

INTRODUCTION

This section provides background information related to the present disclosure which is not necessarily prior art.

Blow molding is a manufacturing process that can be used to form hollow polymeric articles including various containers. The blow molding process can include melting down a polymer and forming it into a preform, where the preform can have a threaded neck leading to a thick walled tube of polymer that is used form the body of the container following expansion. The preform can be heated, placed into a mold, and compressed gas blown therein to expand the preform, where the gas pressure pushes the polymer outward to match the mold and form the body of the container. Once the polymer has sufficiently cooled, the container can be removed from the mold.

Heating and temperature control of the preform can impact blow molding performance. For example, application of heat to the preform can be uniform or nonuniform resulting in temperature gradients in various dimensions within the preform. The temperature of the inside surface of the preform can have an effect on the properties of the resulting blow molded container. Accordingly, ascertaining inside surface temperature of the preform provides additional feedback to a blow mold machine operator, allowing the operator to optimize the blow molding process, better understand the application of heat and the temperature profile of the preform, and therefore optimize blow molding of the container.

One method for determining the temperature of the inside surface of the preform involves cutting the preform in half, reassembling the two halves, and heating the reassembled preform through a heating unit or oven. Upon exiting the heating unit, the halves are separated and the temperature of the inside surface of the preform, now exposed, can be measured using infrared pyrometry, for example.

It would be desirable to have a means that can accurately measure an interior surface temperature of preform that does not require destruction of the preform.

SUMMARY OF THE INVENTION

The present technology includes systems, devices, and methods that relate to obtaining one or more temperatures of an intact blow molding preform, including temperature probes configured to measure one or more portions of the intact blow molding preform.

A temperature probe for obtaining a temperature of a blow molding preform according to the present technology includes a base and an elongate member. The base is configured to receive the temperature. The elongate member extends along an axis from the base and is configured to obtain the temperature at an angle relative to the axis without contacting the blow molding preform. The angle is greater than 0° and less than 180°. The elongate member is configured to convey the temperature to the base.

In certain embodiments, the base can include a pyrometer. The elongate member can include a reflective surface at an end distal to the base, where the reflective surface is configured to direct thermal radiation from the angle to the pyrometer. The reflective surface can be positioned at about a 45° angle relative to the axis and the temperature can be obtained at about a 90° angle relative to the axis. The elongate member can include a hollow member and the reflective surface can be configured to direct thermal radiation from the angle to the pyrometer through the hollow member.

In some embodiments, the elongate member is configured to simultaneously obtain a plurality of temperatures. Each temperature can be obtained at an angle relative to the axis without contacting the blow molding preform, where the angle is greater than 0° and less than 180°. The elongate member can also include a plurality of temperature sensors.

In various embodiments, the temperature probe can further include a second elongate member extending along a second axis from the base. The second elongate member can be configured to obtain a second temperature at a second angle relative to the second axis without contacting the blow molding preform. The second angle can be greater than 0° and less than 180°. The second elongate member can be configured to convey the second temperature to the base.

A method of obtaining a temperature of a blow molding preform is also provided. The method includes heating an intact blow molding preform. A temperature probe is disposed within the heated intact blow molding preform along an axis. The temperature is obtained at an angle relative to the axis without contacting the heated intact blow molding preform, the angle greater than 0° and less than 180°. Certain methods can employ the various temperature probes described herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a perspective view of a temperature probe according to another embodiment of the present technology.

FIG. 3 is a perspective view of a temperature probe according to yet another embodiment of the present technology.

FIG. 4 is a perspective view of the temperature probe shown in FIG. 2 obtaining a temperature of a preform shown in cross-section.

DETAILED DESCRIPTION

Figure 1:
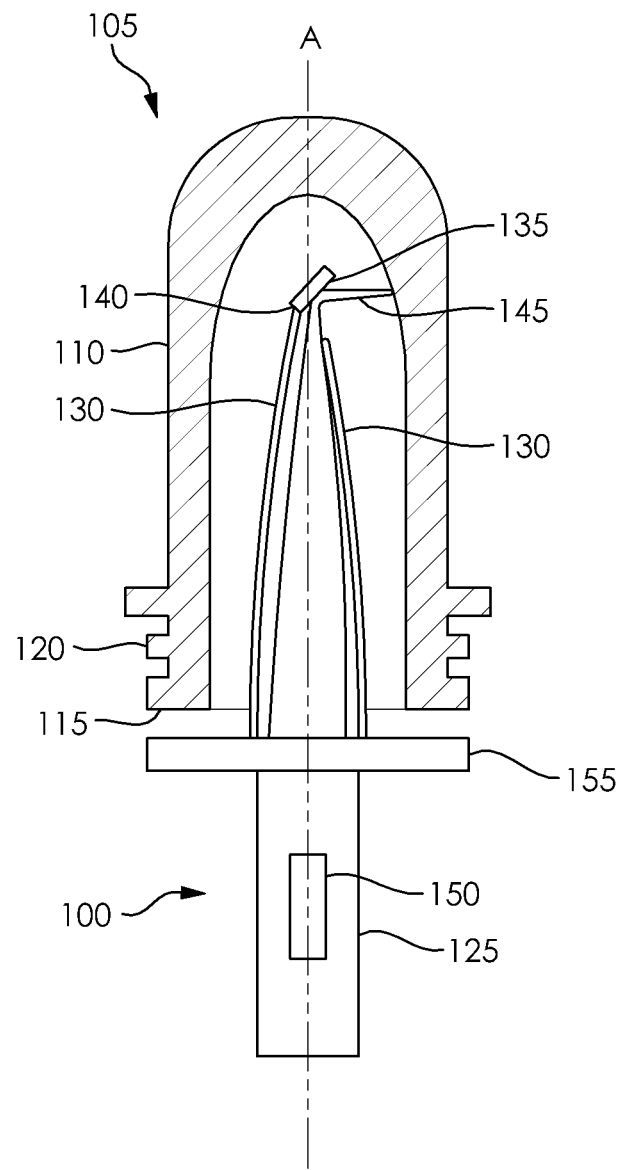
FIG. 1 is a view of a temperature probe according to one embodiment of the present technology obtaining a temperature of a blow molding preform.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding the methods disclosed, the order of the steps presented is exemplary in nature, and thus, the order of the steps can be different in various embodiments. Except where otherwise expressly indicated, all numerical values in this description are to be understood as modified by the word "about" in describing the broadest scope of the present technology.

The present technology is directed toward ascertaining the temperature of various portions of an intact blow molding preform, including the inside surface temperature of the preform, without modifying or destroying the preform. By intact, it is meant that the blow molding preform is a complete, undamaged, and whole preform fit for a blow molding operation. For example, a blow molding preform that has been cut in half and reassembled is not considered intact and is not fit for a blow molding operation. The intact blow molding preform can consist of a single, continuous body. A common intact blow molding preform configuration can include or can consist of a single, continuous body of polymer formed into a thick walled tube having an open end with a threaded neck.

The inside surface temperature of a preform has a direct role in the properties of the resulting blow molded article. Understanding inside surface temperatures provides additional feedback regarding the blow molding process for optimizing the process and the properties of the blow molded article. The present technology includes temperature probes and uses thereof that can communicate temperature information to the operator in various formats, such as temperature values and/or visual color representations, and can be used to obtain temperature information from various portions of the preform, including different portions of the inside surface as well as different portions of the outside surface, including corresponding inside and outside surfaces. By corresponding inside and outside surfaces, it is meant that the inside and outside surfaces are located across a thickness of the preform in a direction substantially perpendicular to the inside and outside surfaces. Multiple temperatures can be obtained sequentially or simultaneously and at different locations to provide a temperature profile of a heated preform, which can identify temperature gradients in the preform. Where multiple temperatures are obtained simultaneously, a temperature profile of the preform can be obtained within a single step. In use, the temperature probe can be inserted into an intact blow molding preform; there is no need to modify the preform before or after heating.

The process of measuring temperature and performing blow molding system adjustments is generally known to be an iterative process. It is desirable to reduce the amount of time this process consumes. The temperature probe and methods described herein can quickly provide numerical and/or visual temperature information, allowing the blow molding system operator to make responsive machine adjustments to establish the preferred temperature profile of the blow molding preform.

Heated preforms begin cooling after they exit the oven, therefore, it is desirable to take temperature measurements quickly and/or nearby the oven. Visual temperature feedback can rapidly report the temperature profile of a heated preform. The temperature probe described herein can occupy minimal space allowing the device to communicate detailed temperature information while maintaining portability and adaptability to various blow molding systems. Additional computers or stationary electronics are not required to provide detailed temperature information such as a temperature profile. The combination of this portability and detailed temperature information benefits a blow molding system operator because it allows measurement and operator analysis to be performed nearby the blow molding machine, providing data from samples subjected to the actual blow molding process of interest. The present technology also eliminates the possibility of aberrant temperature values resulting from obtaining a temperature from a preform that is not intact. For example, a preform that is modified (e.g., by cutting) to expose an interior surface before and/or after heating can exhibit one or more temperature artifacts as a result of the modification process.

The present technology can further provide visual feedback as pass or fail criteria to the operator, reducing potential mistakes or errors related to the operator analyzing raw temperature data. This can include a software analysis that allows the operator to store temperature information for a given process, where a pass indication (e.g., green light) indicates one or more temperatures within a specification profile and a fail indication (e.g., red light) indicates at least one temperature outside of a specification profile. Collection of temperature information can also be used to define a process, such as a target temperature profile, allowing cataloging or storage of various specification profiles for various processes and/or preforms. Additionally, the operator can measure current temperature readings with the device, and compare the temperature readings to a stored profiles or results from later performance testing. This assists the operator in adjusting how the preform is heated prior to blow molding; e.g., the oven settings can be tailored to produce a desired temperature profile.

In certain embodiments, the present technology provides a temperature probe for obtaining a temperature of a blow molding preform. The temperature probe includes a base and an elongate member. The base is configured to receive the temperature. The elongate member extends along an axis from the base and is configured to obtain the temperature without contacting the blow molding preform. The temperature is obtained at an angle greater than 0° and less than 180° relative to the axis. The elongate member is configured to convey the temperature to the base.

The base can be configured in various ways. In some embodiments, the base and the elongate member can be portions of a single body. The base and the elongate member can also be coupled directly or indirectly together, and can further be reversibly coupled. For example, the base can be configured for use with various elongate members, including elongate members of different dimensions, different numbers of elongate members, including the various configurations of elongate members provided in the examples illustrated herein. In one embodiment, the base and the elongate member can comprise a rod- or wand-like body that has a common exterior shell.

The elongate member can convey the temperature to the base as thermal radiation, where the base includes an infrared thermometer, such as a pyrometer. The base can also include various infrared scanning systems or infrared thermal imaging cameras. The temperature can also be conveyed as an electrical signal, for example, where the elongate member includes a temperature sensor that sends an analog or digital signal to the base that is correlated to a temperature value. The base can include a display configured to provide an output corresponding to the temperature. The output can be a numerical value, color, symbol, or other indicia. The base can include a handle or other type of gripping surface and can include a mount or means to couple the temperature probe to part of a blow molding system. For example, the base can include or be coupled to a moveable device, such as a linear actuator, allowing the temperature probe to be automatically and/or remotely deployed to obtain a temperature of a blow molding preform. Alternatively, the blow molding system can be configured to position a heated preform over or about the temperature probe.

The elongate member can include a reflective surface, such as a mirror or polished metal surface (e.g., gold), at a end distal to the base where the reflective surface is configured to direct thermal radiation from the angle to the pyrometer. For instance, where the reflective surface is positioned at about a 45° angle relative to the axis, the temperature is obtained at about a 90° angle relative to the axis. The elongate member can include a hollow member and the reflective surface can be configured to direct thermal radiation from the angle to the pyrometer through the hollow member. In this way, the hollow member blocks thermal radiation from other locations, so that only thermal radiation incident to the reflective surface is conveyed to the base. The hollow member can include a frustoconical portion tapering toward to the reflective surface from the base.

The elongate member can be configured to simultaneously obtain a plurality of temperatures where each temperature is obtained at an angle relative to the axis without contacting the blow molding preform, the angle greater than 0° and less than 180°. In some embodiments, each temperature is obtained at an angle relative to the axis of about 90°. The plurality of temperatures can be obtained using an elongate member that includes a plurality of temperature sensors. For example, the plurality of temperature sensors can be disposed as an array along the axis, each temperature sensor configured to obtain a temperature at about a 90° angle relative to the axis. Each temperature sensor can be configured to convey a temperature to the base and each temperature sensor can be configured to provide an indication of a temperature obtained thereby. The indication of the temperature can include the display of a color. For example, the elongate member can provide a display of an array of colors that represent the temperature profile of the blow molding preform positioned substantially parallel to the elongate member, whether the elongate member is inside of the blow molding preform or outside of the blow molding preform. Color representative of temperature can be displayed by one or more light emitting diodes, for example.

The temperature probe can also include a depth stop coupled to one of the elongate member and the base. The depth stop can operate by contacting a portion of the blow molding preform and positioning the elongate member a preset distance within or alongside the blow molding preform. The depth stop can also operate to limit a distance the elongate member can travel into or alongside the preform, where the depth stop may or may not contact the preform. The position of the depth stop relative to the elongate member can be adjustable. In this way, the amount of the elongate member that can be disposed within or alongside the blow molding preform can be tailored to different sized preforms and/or different portions of the preform. Example configurations of a depth stop include a collar or flange slidably disposed about the elongate member. The collar or flange can have a set screw or other means to fix its position relative to the elongate member. Alternatively, the depth stop can include a resilient member that cooperates with detents on the elongate member to providing various set points. The elongate member can include various indicia, such as a scale or series of calibrated lines like a ruler, that can facilitate positioning the depth stop, can serve as a reference for where one or more temperatures of the blow molding preform are obtained, and/or can identify a particular length of elongate member for use with a particular length of preform.

A second elongate member can also be included with the temperature probe. The second elongate member can extend along a second axis from the base where the second elongate member is configured to obtain a second temperature at a second angle relative to the second axis without contacting the blow molding preform. The second angle can be greater than 0° and less than 180°. The second elongate member can be configured to convey the second temperature to the base. The second elongate member allows the temperature probe to obtain temperatures from two portions of the preform—a temperature from an inside surface of a portion of the blow molding preform (e.g., with the elongate member) and a second temperature from an outside surface of the portion of the blow molding preform (e.g., with the second elongate member). For example, the temperature probe can be configured similar to a two-pronged fork, like a tuning fork, where the elongate member and the second elongate member represent the prongs or tines adjoined to the base. A yoke portion connecting the elongate member and the second elongate member to the base can operate as a depth stop. In such a configuration, the axis of the elongate member and the second axis of the second elongate member can be substantially parallel. One of the elongate member and the second elongate member can be positioned inside the blow molding preform and the other one of the elongate member and the second elongate member can be positioned outside the blow molding preform. In this way, one or more temperatures can be obtained for interior and exterior surfaces of various portions of the preform along a length of the preform to provide a temperature profile and identify any temperature differences or temperature gradient. One or more temperatures can also be obtained for corresponding interior and exterior surfaces of the preform.

The present technology includes methods of obtaining a temperature of a blow molding preform. Such methods can include heating an intact blow molding preform, disposing a temperature probe within the heated intact blow molding preform along an axis, and obtaining the temperature at an angle relative to the axis without contacting the heated intact blow molding preform, the angle greater than 0° and less than 180°. In various embodiments, the method of obtaining a temperature of a blow molding preform can include using one or more of the various temperature probes described herein.

The temperature probe can be used to obtain temperatures of a preform at multiple positions in a single measurement step. Additionally, corresponding inside and outside surface temperatures at the various positions can be obtained. Inside and outside temperature profiles, which can reveal one or more temperature gradients through the thickness of the preform at multiple locations, can allow the blow molding system operator to adjust the heating parameters of the blow molding system. Predetermined temperature profiles can be matched or the temperature profiles can be recorded, providing data to optimize and/or reproduce a certain blow molding process.

Display of temperature can include visual feedback, using light emitting diodes for example, in order to display a color and/or intensity that correlates to the temperature values using a scale that can be correlated to numerical values. The scale can be adjusted in real-time based on the temperatures obtained. Multiple light emitting diodes can be disposed or arrayed on the temperature probe, and the color or intensity can be correlated to a measured or a calculated temperature at each physical location. In this way, visual feedback is provided at the location where the temperature is obtained, providing an immediate representation of the temperature profile of the preform. The visual representation of the temperature profile can identify hot zones or cold zones for the blow molding system operator. In addition, this visual data can be programmed to indicate whether the temperature is within a desired specification, or can include pass or fail criteria. For instance, a green color can indicate a zone is within temperature specification, a red color can indicate a zone is hotter than the temperature specification, and a blue color can indicate a zone is colder than the temperature specification. Various locations of the preform can have the same or different specifications, depending on the desired blow molding parameters.

The temperature probe can include various processing, memory, and software functions and/or can interface with other components of the blow molding system to convey one or more temperatures to the system for recording and analysis. One or more temperature profiles can be stored for a given process, and the system can compare a desired profile with the temperature(s) obtained from a given preform. For example, the system can overlay and display a plot of the current temperature profile for a preform with a target temperature profile for comparison. This allows the operator to determine how the current temperature profile compares to the target temperature profile. Adjustments to the heating portion of the blow molding process can then be made to optimize the heating and match the target temperature profile. In this way, oven adjustments can be made in real-time using intact blow molding preforms that are blow molded and the effect on the resulting containers determined.

In some embodiments, the present technology further provides for a temperature probe and methods of using the temperature probe where the probe includes one or more temperature sensors and one or more visual feedback displays such as light emitting diodes. At least one sensor obtains the inside surface temperature of an intact blow molding preform. The probe can have a plurality of sensors to obtain inside surface temperatures at multiple locations using a single measurement step. Additionally, one or more sensors can obtain outside surface temperatures at corresponding locations for the inside surface temperatures. The inside sensor(s) and outside sensor(s) can be configured as two separate arrays that move together, disposed on two elongate members for example, so as the insertion depth of one array inside the preform is varied, the other array also moves to the corresponding location on the outside of the preform.

Where the temperature probe includes one or more visual feedback displays, such displays can include devices such as numerical displays and light emitting devices. Light emitting devices can include multi-color light emitting diodes, where the color or intensity can be adjusted to relate to a temperature value or temperature change. For example, multi-color light emitting diodes can visually communicate a color temperature scale indicating the location of the hottest and coldest measurements along the length of the preform. The color or intensity of the light emitting diodes can also be used to indicate whether the temperature is within a user-defined specification, such as displaying green to indicate an acceptable condition and displaying red to indicate a failing condition. The light emitting diodes can be used to indicate the location of a temperature sensor where a numerical value of the temperature obtained is currently shown on a different display.

Other embodiments of the present temperature probe and methods of use include the following aspects. The body of the temperature probe can be formed of a reflective material or can have a matte black finish, as desired. The temperature probe can be electronic and can be powered off a wall outlet and/or by using one or more batteries. Temperature sensors employed can be non-contact infrared sensors and can include various optical components such as lenses or mirrors. While the temperature probe can be tailored to obtain one or more temperature measurements from an intact blow molding preform, the temperature probe can be used in other contexts. For example, the temperature probe can be adapted to obtain one or more temperatures from any manner of hollow or cylindrical items where there is limited access or exposure to the inside surface of the item. The temperature probe can be compact in size and therefore easily repositioned or moved to other locations within the blow molding system or incorporated into another workflow or process. Portability and ease-of-use expands the utility of the temperature probe. The temperature probe can include digital or analog output to be utilized for data-logging purposes and can include wireless transmission capabilities.

The temperature probe can include a linear actuator and/or a rotational actuator to adjust the position of temperature sensors and obtain temperatures from different portions of the preform. For example, the temperature probe and/or one or more individual sensors can be moved across a surface while obtaining temperatures and the temperature probe and/or one or more individual sensors can be rotated to generate a circumferential temperature profile within the preform. Various temperature profiles can be obtained and identification of various temperature gradients is possible.

The temperature probe can include various interface means, including controls, screens, and/or buttons to allow a user to select ways to obtain temperatures, including temperatures from particular sensors, and various temperature reporting and feedback modes. The temperature probe can be installed into existing blow molding system components to provide real-time feedback to the operator or an automated or computerized control system during a manufacturing process. The temperature probe can include a software package which provides data analysis tools for the operator, such as actual versus target temperature profile analysis. Additionally the software can be used to configure the device and store data. The temperature probe as described herein can be inserted into an intact preform, therefore it is not necessary to modify the preform to obtain a temperature and the preform can still be blow molded into a container or other blow molded article.

Where the temperature probe includes multiple temperature sensors, one of the temperature sensors can be positioned at the distal end of the elongate member to obtain a temperature substantially in-line with the axis of the elongate member. In this way, a temperature can be obtained for the portion of the preform opposite of an open end through which the elongate member is disposed. The temperature probe can be powered and/or communicate with a blow molding system or other devices via a USB cable. Temperature sensors can include sensors rated from about −40° C. to about 180° C. Circuitry for the temperature probe can be housed along the entire length of the probe interior or in the base. The depth stop can also be configured to act as a heat shield to protect a hand of a user, to house electronics and the like of the probe, or a combination of the foregoing, as desired.

EXAMPLES

With reference to FIG. 1, a first embodiment of a temperature probe 100 is shown obtaining a temperature of a blow molding preform 105. The preform 105 is intact and has a single, continuous body 110 of polymer configured as a thick walled tube having an open end 115 with a threaded neck 120. The temperature probe 100 includes a base 125 and an elongate member 130. The base 125 is configured to receive a temperature using a pyrometer. The elongate member 130 extends along an axis (A), depicted as a stippled line, from the base 125. The elongate member 130 is configured to obtain the temperature at an angle relative to the axis (A) without contacting the blow molding preform. The angle can range from greater than 0° to less than 180°. The elongate member 130 is configured to convey the temperature to the base 125. As shown, the elongate member 130 includes a reflective surface 135 at an end distal 140 to the base 125, where the reflective surface 135 is configured to direct thermal radiation 145 from the angle to the pyrometer in the base 125. In the temperature probe 100 depicted, the reflective surface 135 is positioned at about a 45° angle relative to the axis (A) and the temperature is obtained at about a 90° angle relative to the axis (A). The elongate member 130 is a hollow, frustoconical elongate member and the reflective surface 135 directs the thermal radiation 145 from the angle to the pyrometer in the base 125 through the hollow, frustoconical elongate member 130. In this way, thermal radiation from portions of the preform 105, other than the portion at the angle relative to the axis (A), is substantially shielded and prevented from being conveyed to the pyrometer in the base 125. The base 125 includes a display 150 configured to provide an output corresponding to the temperature. The temperature probe 100 also includes a depth stop 155 that can be coupled to one of the elongate member 130 and the base 125. The depth stop 155 is positioned to contact the blow molding preform 105 and limit the distance the elongate member 130 is disposed within or alongside the preform 105. However, it is not necessary that the depth stop 155 actually contact the preform 105 and the depth stop 155 can operate more as a safety device to prevent contact of the distal end 140 of the elongate member 130 with the preform 105. The position of the depth stop 155 can also be adjusted relative to the elongate member 130.

With reference to FIG. 2, a second embodiment of a temperature probe 200 for obtaining a temperature of a blow molding preform is shown. The temperature probe 200 has a base 205 configured to receive the temperature and an elongate member 210 extending along an axis (A) from the base 205. The elongate member 210 is configured to obtain the temperature at an angle relative to the axis (A) without contacting the blow molding preform, where the angle is greater than 0° and less than 180°. The elongate member 210 is configured to convey the temperature to the base 205, where the temperature can be depicted on a display 215. The elongate member 210 is configured to simultaneously obtain a plurality of temperatures using a plurality of temperature sensors 220. Each temperature is obtained at an angle relative to the axis without contacting the blow molding preform, the angle greater than 0° and less than 180°. As illustrated, each temperature sensor 220 is configured to obtain a temperature at about a 90° angle relative to the axis. Each temperature sensor is configured to convey a temperature to the base 205, which can be represented on the display 215 along with identification of the particular temperature sensor 220. Particular temperature sensors 220 are identified sequentially or related to a position on the elongate member 210 using a scale 225 marked on the elongate member 210. A depth stop 230 is coupled to the elongate member 210 to limit how far the elongate member 210 can be disposed within or alongside the blow molding preform. The position of the depth stop 230 is adjustable relative to the elongate member 210 as the depth stop 230 is slidably disposed about the elongate member 210. A set screw 235 allows releasably fixing the depth stop 230 along the elongate member 210, where adjustment can be guided by the scale 225. The depth stop 230 may include a protuberance or a channel adapted to fit an end of the preform so that the preform the temperature probe 200 is centered within the hollow interior of a preform undergoing a temperature measurement. The depth stop 230 may also include an extension extending therefrom that facilitates the placement of a preform undergoing a temperature measurement with the temperature probe 200 adjacent an exterior surface thereof, thereby facilitating temperature measurements being taken at a uniform and/or desired distance from an exterior of the preform.

With reference to FIG. 3, a third embodiment of a temperature probe 300 for obtaining a temperature of a blow molding preform is shown that shares several aspects with the second embodiment of a temperature probe 200 shown in FIG. 2. Shared aspects are denoted by the same reference numerals used in FIG. 2. However, the third embodiment of a temperature probe 300 is configured so that each temperature sensor 220 provides an indication of a temperature obtained thereby. Light emitting diodes 305 are used to display a color type and/or color intensity that is indicative of the temperature obtained by each temperature sensor 220. In this way, the temperature probe 300 can provide immediate visual feedback of temperatures obtained from a preform.

With reference to FIG. 4, the second embodiment of a temperature probe 200 from FIG. 2 is shown obtaining multiple temperatures of a blow molding preform 405. The preform 405 is intact and has a single, continuous body 410 of polymer configured as a thick walled tube having an open end 415 with a threaded neck 420.

Figure 5:
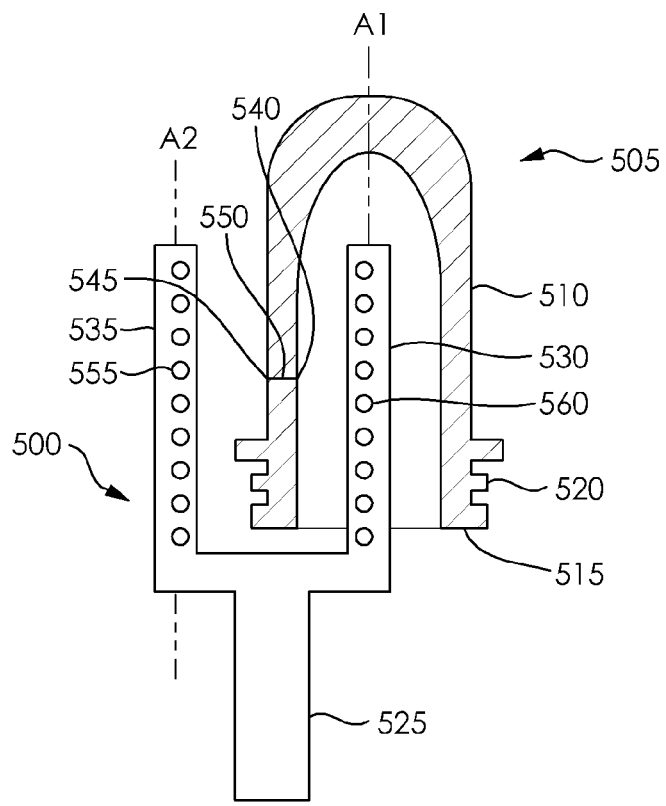
FIG. 5 is a perspective view of a temperature probe according to yet another embodiment of the present technology obtaining a temperature of a preform shown in cross-section.

With reference to FIG. 5, a fourth embodiment of a temperature probe 500 is shown obtaining multiple temperatures of a blow molding preform 505. The preform 505 is intact and has a single, continuous body 510 of polymer configured as a thick walled tube having an open end 515 with a threaded neck 520. The temperature probe 500 has a base 525 configured to receive the temperatures, a first elongate member 530 extending along a first axis (A1) from the base 525, and a second elongate member 535 extending along a second axis (A2) from the base 525. The first elongate member 530 is configured to obtain one or more temperatures at an angle relative to the first axis (A1) without contacting the blow molding preform 505, where the angle is greater than 0° and less than 180°, using temperature sensors 555. The first elongate member 530 is further configured to convey the temperature to the base 525.

The second elongate member 535 is configured to obtain one or more temperatures at a second angle relative to the second axis (A2) without contacting the blow molding preform 505, where the second angle is greater than 0° and less than 180°, using temperature sensors 560. The second elongate member 535 is further configured to convey the second temperature to the base 525. For example, the first elongate member 530 and the second elongate member 535 can obtain temperatures from corresponding inside and outside surfaces 540, 545, where the respective inside and outside surfaces 540, 545 are located across a thickness 550 of the preform in a direction substantially perpendicular to the inside and outside surfaces 540, 545 of the preform, as shown in FIG. 5. Multiple temperatures can be obtained sequentially or simultaneously and at different locations using the various temperature sensors 555, 560 to provide a temperature profile of a heated preform 505, which can identify temperature gradients in the preform 505.

Figure 6:
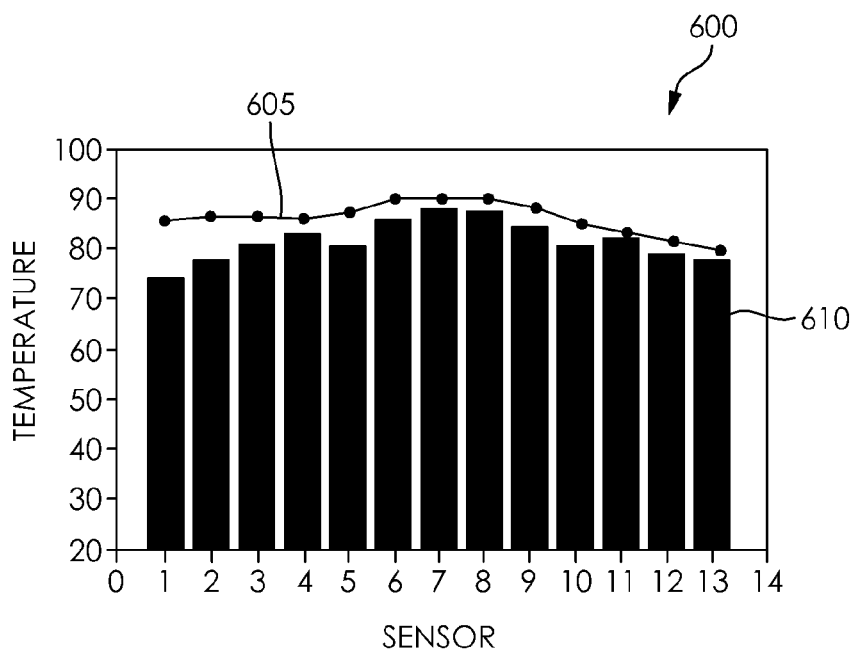
FIG. 6 depicts a temperature profile generated by the temperature probe shown in FIG. 3.

With reference to FIG. 6, a graphical depiction of temperatures obtained from thirteen temperature sensors using a temperature probe is shown at 600. The line graph portion 605 can indicate peak measured temperatures and the bar graph portion 610 can indicate live temperatures. Each bar of the bar graph portion 610 can also be color coded to correspond to a temperature scale. Additionally, where the temperatures are obtained using an embodiment such as the third embodiment of a temperature probe 300 shown in FIG. 3, each bar can match the color of light emitting diodes 305 on the temperature probe 300. In this way, the graphical depiction of the temperatures obtained by the probe, and the matching color of light emitting diodes 305 for the temperature sensors 220, can provide immediate visual feedback of temperatures obtained from a preform. The graphical depiction 600 also allows an operator to rapidly ascertain temperature values attributable to particular sensors 220. Other graphical depictions can include overlays of temperatures obtained from corresponding inside and outside surfaces of the preform and overlays of live or peak temperatures with target value temperatures (not shown).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A handheld temperature probe for obtaining a temperature of a blow molding preform comprising:
   a base configured to receive the temperature;
   an elongate member extending along an axis from the base, the elongate member configured to obtain the temperature at an angle relative to the axis without contacting the blow molding preform, the angle greater than 0° and less than 180°, the elongate member configured to convey the temperature to the base; and
   a depth stop coupled to one of the elongate member and the base, the depth stop configured to contact an open end of the blow molding preform and position the elongate member a preset distance within or alongside the blow molding preform.

2. The handheld temperature probe of claim 1, wherein the base includes a pyrometer.

3. The handheld temperature probe of claim 2, wherein the elongate member includes a reflective surface at an end distal to the base, the reflective surface configured to direct thermal radiation from the angle to the pyrometer.

4. The handheld temperature probe of claim 3, wherein the reflective surface is positioned at about a 45° angle relative to the axis and the temperature is obtained at about a 90° angle relative to the axis.

5. The handheld temperature probe of claim 3, wherein the elongate member includes a hollow member and the reflective surface is configured to direct thermal radiation from the angle to the pyrometer through the hollow member.

6. The handheld temperature probe of claim 5, wherein the hollow member includes a frustoconical portion tapering toward to the reflective surface.

7. The handheld temperature probe of claim 1, wherein the base includes a display configured to provide an output corresponding to the temperature.

8. The handheld temperature probe of claim 1, wherein the elongate member is configured to simultaneously obtain a plurality of temperatures, each temperature obtained at an angle relative to the axis without contacting the blow molding preform, the angle greater than 0° and less than 180°.

9. The handheld temperature probe of claim 8, wherein the elongate member includes a plurality of temperature sensors.

10. The handheld temperature probe of claim 9, wherein each temperature sensor is configured to obtain a temperature at about a 90° angle relative to the axis.

11. The handheld temperature probe of claim 9, wherein each temperature sensor is configured to convey a temperature to the base.

12. The handheld temperature probe of claim 9, wherein each temperature sensor is configured to provide an indication of a temperature obtained thereby.

13. The handheld temperature probe of claim 12, wherein the indication of the temperature includes display of a color.

14. The handheld temperature probe of claim 13, wherein the display of the color is provided by a light emitting diode.

15. The handheld temperature probe of claim 1, wherein a position of the depth stop is adjustable relative to a position along the axis of the elongate member.

16. The handheld temperature probe of claim 1, further comprising a second elongate member extending along a second axis from the base, the second elongate member configured to obtain a second temperature at a second angle relative to the second axis without contacting the blow molding preform, the second angle greater than 0° and less than 180°, the second elongate member configured to convey the second temperature to the base.

17. The handheld temperature probe of claim 16, wherein the temperature is obtained from an inside surface of a portion of the blow molding preform and the second temperature is obtained from an outside surface of the portion of the blow molding preform.

18. A method of obtaining a temperature of a blow molding preform comprising:
   heating an intact blow molding preform;
   disposing a temperature probe within the heated intact blow molding preform along an axis;

obtaining the temperature at an angle relative to the axis without contacting the heated intact blow molding preform, the angle greater than 0° and less than 180% wherein the temperature probe includes:

a base configured to receive the temperature;

an elongate member extending along an axis from the base, the elongate member configured to obtain the temperature at an angle relative to the axis without contacting the blow molding preform, the angle greater than 0° and less than 180°, the elongate member configured to convey the temperature to the base; and a depth stop coupled to one of the elongate member and the base, the depth stop configured to contact an open end of the blow molding preform and position the elongate member a preset distance within or alongside the blow molding preform.

19. A handheld temperature probe for obtaining a temperature of a blow molding preform comprising:

a base configured to receive the temperature;

an elongate member extending along an axis from the base, the elongate member configured to simultaneously obtain a plurality of temperatures using a plurality of temperature sensors, each temperature obtained at an angle relative to the axis without contacting the blow molding preform, the angle greater than 0° and less than 180°, the elongate member configured to convey the plurality of temperatures to the base; and a depth stop coupled to one of the elongate member and the base, the depth stop configured to contact an open end of the blow molding preform and position the elongate member a preset distance within or alongside the blow molding preform;

wherein the base includes a display configured to provide an output corresponding to the plurality of temperatures.

20. The handheld temperature probe of claim 19, wherein each temperature sensor is configured to provide an indication of a temperature obtained thereby, the indication including a display of a color adjacent the respective temperature sensor.

* * * * *